March 12, 1935.  C. W. LOVERIDGE ET AL  1,994,397
ROTARY ENGINE
Filed March 28, 1934
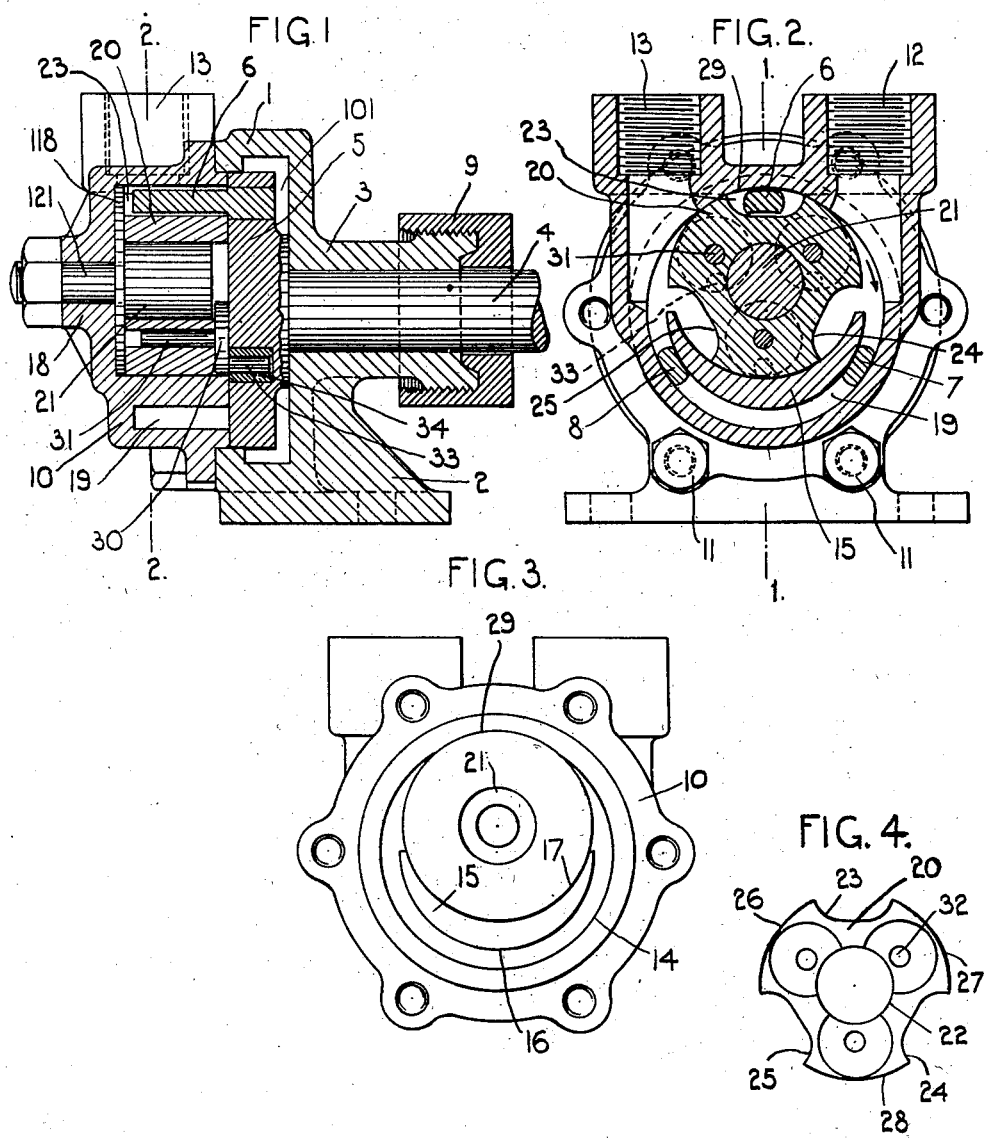
Inventors
Claude W. Loveridge
Laurence J. Lambe
By
Ernest S. Mechlin
Attorney Patented Mar. 12, 1935

1,994,397

UNITED STATES PATENT OFFICE 1,994,397

ROTARY ENGINE

Claude Warren Loveridge and Laurence Joseph Lambe, Hampstead, London, England

Application March 28, 1934, Serial No. 717,822
In Great Britain March 23, 1933

6 Claims. (Cl. 103—125)

This invention relates to rotary engines, pumps, compressors, meters or like apparatus, and the invention has for its general object to provide a construction of rotary engine, pump or the like which can be cheaply manufactured, readily assembled and erected and which shall be capable of maintaining a high degree of efficiency without necessary recourse to high speeds of rotation.

Further and favourable objects will appear from the following description.

In accordance with the invention an engine, pump, compressor, meter or like apparatus comprises a cylindrical casing having an inner cylindrical wall, side walls and an intermediate crescent-shaped wall projecting from one of said side walls and forming with the cylindrical wall a piston chamber, inlet and outlet ports to said chamber, a rotor, pistons on said rotor traversing said chamber during the working of the engine, and an eccentric rotating seal member carried by the side wall from which the crescent-shaped wall projects rotating in consonance with the rotor, overlapping the center thereof, and having pockets for the receipt of the pistons with circular peripheral portions joining said pockets and isolating the inlet and outlet ports one from the other.

In preferred embodiments of the invention intended for use as a pump, an open cylindrical casing and integral bracket is furnished with a bearing mounting the rotor shaft, while a flanged cover for the casing mounts a bearing pin for the rotating seal, the pump cylinder or piston chamber within the casing which is traversed by the piston or pistons being also formed by a crescent-shaped or part-annular projecting flange on said cover, the internal periphery of which is concentric with the rotating seal, it being appreciated that the rotating seal makes nominal contact with said internal periphery to isolate the inlet and outlet ports during the working of the pump.

Synchronized rotation of the seal and rotor or rotary piston may be obtained by means of external gearing or in any other appropriate manner, for instance by means of a pin on the rotating seal engaging a slot or slotted member on the rotary piston or vice versa, the length of the slot being at least equal to twice the eccentricity between the seal and the piston.

Where desired, more than one crank pin may be employed to effect synchronized rotation between the rotor and the rotating seal, and in preferred constructions of pump where the rotor is furnished with three pistons, a similar number of cranks may be provided on the rotating seal, the crank pins thereof engaging in appropriate bearings provided in the body of the rotor, this arrangement giving a synchronized drive completely free from impulse.

Reference will now be had to the accompanying drawing wherein,—

Figs. 1–4 are views of a preferred form of three-piston pump, Fig. 1 being a longitudinal section, Fig. 2 a transverse section on the line II—II of Fig. 1, Fig. 3 a view of the flanged cover plate removed, and Fig. 4 a detailed view of the rotating seal.

Referring now to the drawing, the pump casing—which is of general circular cylindrical form—is designated 1 and is shown made integrally with a pedestal bracket 2 and a bearing 3 for a pump shaft 4.

A rotor disc 5 is formed integral with the shaft 4 adjacent one side wall of the casing and has projecting from its front face three pistons 6, 7 and 8 disposed at 120° one to the other and concentrically with the axis of rotation of the rotor 5.

9 indicates a packing gland, which may be of any suitable form depending upon the material which is to be dealt with by the pump, which gland is furnished at the outer extremity of the bearing 3.

10 generally designates a flanged cover plate constituting the other side wall which is secured to the casing by studs 11 or nuts and bolts and upon which cover are formed the inlet and outlet ports 12 and 13 respectively, the direction of rotation of the rotor 5 being taken to be clockwise, as indicated by the arrow in Fig. 2, although it will be appreciated that the pump is reversible.

The cover 10 is a cup-shaped member having an inner circular cylindrical periphery 14 which is traversed by the pistons in the working of the pump and, projecting from the cover or side wall into nominal contact with the front face of the rotor 5, is a crescent-shaped or part-annular wall 15, the outer peripheral wall 16 of which is concentric with the cylindrical wall 14 and therefore with the axis of rotation of the rotor 5, the opposed portions of the walls 14 and 16 defining the pump cylinder or piston chamber 19 which is traversed successively by the pistons 6, 7 and 8 in the working of the pump.

20 designates a rotating seal member eccentrically mounted for rotation within the flanged cover plate 10 upon a bearing pin 21 carried by the end wall 18 of the cover 10, the aforementioned crescent-shaped wall 15 having an inner surface 17 concentric with said rotating seal 20, as more clearly shown in Fig. 2.

The rotating seal member 20 has a large central circular bore 22 giving an adequate bearing surface on the pin 21, and on its peripheral edge is formed with pockets 23, 24 and 25 for the receipt respectively of the pistons 6, 7 and 8 during the working of the pump, the remaining peripheral portions 26, 27 and 28 being circular and making nominal contact with the inner peripheral surface 17 of the projecting wall 15 and also with the portion 29 of the cylindrical wall 14 between the inlet and outlet ports 12 and 13 to isolate these latter one from the other.

Synchronized rotation of the seal member 20 with the rotor 5 is obtained in this embodiment by means of three discs 30 having axial journal pins 31 mounted in bearings 32 constituted by holes bored through the rotating seal 20, as shown in Fig. 4, crank pins 33 projecting from the opposite faces of said discs and engaging driving collars 34 recessed into the surface of the rotor 5.

It will be understood that the throw of the crank pins 33 is equal to the degree of eccentricity between the respective axes of rotation of the rotor 5 and of the rotating seal 20, so that when the rotor is driven by the shaft 4 the seal 20 rotates in consonance therewith, the eccentricity being accommodated by the crank pins 33 which, with their discs 30, rotate about the axes of the journals 31.

The pump cylinder or piston chamber 19 which is defined between the outer wall 16 of the crescent-shaped member 15 of the circular cylindrical wall 14 of the cover 10 extends for half the circumference of the rotor 5 and consequently each piston is effective during half of each revolution so that with a three-piston type pump, as in this embodiment, the delivery is continuous, the fluid being driven through the chamber to the outlet side of the pump successively by the pistons 8, 7 and 6, the piston 8, in the position of the pump illustrated in Fig. 2, being just about to leave the cylinder after finishing its effective stroke, and the piston 7 having just entered said chamber 19 at the commencement of its effective stroke.

On leaving the chamber the pistons enter their respective pockets in the rotating seal 20, the piston 6 in Fig. 2 being shown in its pocket 23 during its return to the suction side of the pump, and it will be seen that the extent of each pocket is considerably less than the extent of the wall 29 joining the inlet and outlet sides of the pump at this point, an effective seal being thus maintained by the portion of the circular periphery 26, 27 or 28 of the seal which always remains in nominal contact with the wall 29.

It will be noted more clearly from Fig. 3 that the wall 29 between the ports is concentric with the pin 21 constituting the axis of the rotating seal 20 and intercepts the circular wall 14 which is concentric with the rotor 5, this slight overlapping between the rotating seal and the rotor being necessary effectively to maintain the peripheral seal.

118 is an adjustable or renewable disc furnished on the pin 21 adjacent the end wall 18 of the cover 10, between the surface of which disc and the surface of the rotor 5 the seal 20 rotates thereby serving to isolate the inlet side of the pump from the outlet side along these surfaces.

The provision of the renewable disc 118 enables wear to be taken up without difficulty on the simple removal of the cover 10 by undoing the bolts 11, withdrawing the seal 20 from the pin 21, and replacing the existing disc 118 by one of slightly greater thickness.

The disc may be free to rotate or may be locked against rotation by engagement with the shoulder which separates the bearing portion of the pin 21 from its screw-threaded extension 121 which carries a nut securing the bearing pin in position on the cover 10. Where desired the disc 118 may be adjustable further to facilitate taking up wear on the parts.

It will be appreciated that during the working of the pump the rotor 5 is subjected to axial thrust by the fluid under pressure and to counterbalance this thrust an annular space 101 formed within the casing 1 at the rear of the rotor 5 can be connected with the delivery side of the pump so that the rear face of the rotor is also subjected to the delivery pressure.

By the present invention a construction of pump or rotary engine is attained which lends itself to cheapness of manufacture and provides high volumetric efficiency with substantially a straight line delivery and a delivery and suction free from impulses and in which owing to the elimination of the necessity for frictional contact between the working parts, these latter may be equipped with an insulating covering thereby suiting the machine to operation with destructive fluids.

Lastly, by reason of the isolation of the pockets in the rotating seal compressed fluid therein can be passed to the trapped volume in the cylinder or otherwise disposed of so as to ensure effective scavenging.

What we claim is:—

1. A rotary engine comprising a casing having a cylindrical wall, side walls and an intermediate crescent-shaped wall projecting from one of the side walls and forming with the cylindrical wall a piston chamber, inlet and outlet ports for said chamber, a rotor within the casing, pistons carried by said rotor traversing said chamber during the operation of the engine, a sealing member eccentrically journaled with respect to and overlapping the center of the rotor, said sealing member having pockets for the reception of said pistons, and means located in juxtaposition to the rotor and sealing member for synchronizing them.

2. A rotary engine comprising a casing having a cylindrical wall, side walls and an intermediate crescent-shaped wall projecting from one of the side walls and forming with the cylindrical wall a piston chamber, inlet and outlet ports for said chamber, a rotor within the casing, pistons carried by said rotor traversing said chamber during the operation of the engine, a sealing member eccentrically journaled with respect to and overlapping the center of the rotor, said sealing member having pockets for the reception of said pistons, and crank means located in juxtaposition to the rotor and sealing member for synchronizing them.

3. A rotary engine comprising a casing having a cylindrical wall, side walls and an intermediate crescent-shaped wall projecting from one of the side walls and forming with the cylindrical wall a piston chamber, inlet and outlet ports for said chamber, a rotor within the casing, pistons carried by said rotor traversing said chamber during the operation of the engine, a sealing member eccentrically journaled with respect to and overlapping the center of the rotor, said sealing member having pockets for the reception of said pistons, and crank members located between the confronting faces of and directly connecting the rotor and sealing member for synchronizing them.

4. A rotary engine comprising a casing having a cylindrical wall, side walls and an intermediate crescent-shaped wall projecting from one of the side walls and forming with the cylindrical wall a piston chamber, inlet and outlet ports for said chamber, a rotor within the casing, pistons carried by said rotor traversing said chamber during the operation of the engine, a sealing member eccentrically journaled with respect to and overlapping the center of the rotor, said sealing member having pockets for the reception of said pistons, disks located between the rotor and sealing member and journally connected with the latter, and crank pins on the disks journaled in the rotor for synchronizing rotation of the rotor and sealing member.

5. A rotary engine comprising a casing having a cylindrical wall, side walls and an intermediate crescent-shaped wall projecting from one of the side walls and forming with the cylindrical wall a piston chamber, inlet and outlet ports for said chamber, a rotor within the casing, pistons carried by said rotor traversing said chamber during the operation of the engine, a sealing member eccentrically journaled with respect to and overlapping the center of the rotor, said sealing member having pockets for the reception of said pistons, disks located between the rotor and sealing member and journaled in recesses in the latter, and crank pins on said disks journaled in the rotor.

6. A rotary engine comprising a casing having a cylindrical wall, side walls and an intermediate crescent-shaped wall projecting from one of the side walls and forming with the cylindrical wall a piston chamber, inlet and outlet ports for said chamber, a rotor within the casing, pistons carried by said rotor traversing said chamber during the operation of the engine, a sealing member eccentrically journaled with respect to and overlapping the center of the rotor, said sealing member having pockets for the reception of said pistons, disks located between the rotor and sealing member, pins extending from the centers of said disks and journaled in the sealing member, and other pins extending eccentrically from said disks and journaled in the rotor.

CLAUDE WARREN LOVERIDGE.
LAURENCE JOSEPH LAMBE.